US009392266B2

(12) United States Patent
Wu et al.

(10) Patent No.: US 9,392,266 B2
(45) Date of Patent: Jul. 12, 2016

(54) THREE-DIMENSIONAL DISPLAY DEVICE

(75) Inventors: Wei-Cheng Wu, Taichung (TW);
Kuo-Sen Kung, Kaohsiung (TW);
Chun-Hao Tu, Changhua County (TW);
Ren-Hong Jhan, Yunlin County (TW);
Fang-Hui Chan, Hsinchu County (TW);
Jen-Pei Tseng, Hsinchu (TW); Yu-Jung Liu, Kaohsiung (TW); Jiun-Jye Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 804 days.

(21) Appl. No.: 13/526,503

(22) Filed: Jun. 18, 2012

(65) Prior Publication Data
US 2013/0107533 A1      May 2, 2013

(30) Foreign Application Priority Data
Oct. 31, 2011    (TW) .............................. 100139621 A

(51) Int. Cl.
H04N 13/04        (2006.01)
H04N 13/00        (2006.01)
G02B 27/22        (2006.01)

(52) U.S. Cl.
CPC ............ *H04N 13/0411* (2013.01); *G02B 27/22* (2013.01); *G02B 27/2214* (2013.01); *G02B 27/2228* (2013.01); *H04N 13/00* (2013.01); *H04N 13/0003* (2013.01); *H04N 13/04* (2013.01)

(58) Field of Classification Search
CPC ............... G02B 27/22; G02B 27/2207; G02B 27/2221; G02B 27/2228; G02B 27/2271; G02B 27/2214; H04N 13/00; H04N 13/0003; H04N 13/0007; H04N 13/0011; H04N 13/0018; H04N 2213/001; H04N 2213/003; H04N 2213/005; H04N 13/04; H04N 13/0411; G02F 1/13; G02F 1/1306; G09G 3/36
USPC ................... 359/464; 345/92; 349/15, 61, 113
See application file for complete search history.

(56) References Cited

U.S. PATENT DOCUMENTS

| 2009/0008735 | A1* | 1/2009 | Ogino ............... H01L 27/14601 257/436 |
| 2009/0066864 | A1 | 3/2009 | Koyama et al. |
| 2010/0014313 | A1* | 1/2010 | Tillin et al. .................... 362/606 |
| 2010/0253642 | A1* | 10/2010 | Tsuzaki ............... G06F 3/0412 345/173 |

(Continued)

FOREIGN PATENT DOCUMENTS

| CN | 201293891 | 8/2009 |
| CN | 101995691 | 3/2011 |

OTHER PUBLICATIONS

"Office Action of China Counterpart Application", issued on May 30, 2014, p. 1-p. 9.

(Continued)

*Primary Examiner* — Bumsuk Won
*Assistant Examiner* — William R Alexander
(74) *Attorney, Agent, or Firm* — Jianq Chyun IP Office

(57) ABSTRACT

A three-dimensional display device includes a display panel and a barrier structure. The barrier structure is located at one side of the display panel. Besides, the barrier structure includes a plurality of barrier patterns and a plurality of transparent slits. The barrier patterns and the transparent slits are arranged alternately. In particular, the barrier patterns include a photoelectric conversion structure.

19 Claims, 10 Drawing Sheets

(56) References Cited

U.S. PATENT DOCUMENTS

| | | | |
|---|---|---|---|
| 2011/0063421 A1* | 3/2011 | Kubota | 348/52 |
| 2011/0156996 A1* | 6/2011 | Izumi | G06F 3/0412 345/92 |
| 2011/0187832 A1* | 8/2011 | Yoshida | A63F 13/02 348/46 |

OTHER PUBLICATIONS

"Office Action of China Counterpart Application", issued on Oct. 23, 2013, p. 1-p. 6.

"Office Action of Taiwan Counterpart Application", issued on Apr. 25, 2014, p. 1-p. 5.

* cited by examiner

THREE-DIMENSIONAL DISPLAY DEVICE

CROSS-REFERENCE TO RELATED APPLICATION

This application claims the priority benefit of Taiwan application serial no. 100139621, filed on Oct. 31, 2011. The entirety of the above-mentioned patent application is hereby incorporated by reference herein and made a part of this specification.

BACKGROUND OF THE INVENTION

1. Field of the Invention

The invention relates to a display device, and more particularly to a three-dimensional (3D) display device.

2. Description of Related Art

In recent years, as display technology advances, users have become more and more demanding on display quality, e.g., image resolution, color saturation, and so forth. In addition to high resolution and high color saturation, display devices which are capable of displaying stereoscopic images have been developed in order to satisfy the need of users to view real images.

In the existing stereoscopic image display technologies, a barrier panel is arranged between the display panel and the user, and the barrier panel is utilized for controlling images captured by respective eyes of a viewer. According to visual characteristics of human eyes, a stereoscopic image may be produced when two images with the same content but different parallax are respectively captured by a viewer's left and right eyes. Therefore, the corresponding images are respectively transmitted to a viewer's left and right eyes through slits of the barrier panel.

However, the brightness of the display panel is reduced when the barrier panel is applied to respectively transmit the images to a viewer's left and right eyes. Hence, it is often necessary to increase the brightness of the light source of the display panel, such that the 3D display device is allowed to have sufficient brightness. The increase in the brightness of the light source of the display panel, however, boosts power consumption of the 3D display device. As a result, the research and development of existing 3D display devices aim at reducing power consumption of the 3D display device in which the barrier panel is applied.

SUMMARY OF THE INVENTION

The invention is directed to a 3D display device capable of lessening power consumption of a conventional 3D display device in which a barrier panel is employed.

In the invention, a 3D display device that includes a display panel and a barrier structure is provided. The barrier structure is located at one side of the display panel. Besides, the barrier structure includes a plurality of barrier patterns and a plurality of transparent slits. The barrier patterns and the transparent slits are arranged alternatively. In particular, the barrier patterns include a photoelectric conversion structure.

Based on the above, in the barrier structure of the 3D display device, the first photoelectric conversion structure serves as the barrier patterns according to the invention. When light passes through the transparent slits of the barrier structure, the left-eye image and the right-eye image of the display panel can be respectively transmitted to the left eye and the right eye of a viewer. The light blocked by the barrier structure can be absorbed by the barrier patterns (i.e., the photoelectric conversion structure) and converted into electricity, and the electricity can be fed back to the 3D display device and then can be re-used. As a result, the 3D display device of the invention has less power consumption than that of the conventional 3D display device.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1:
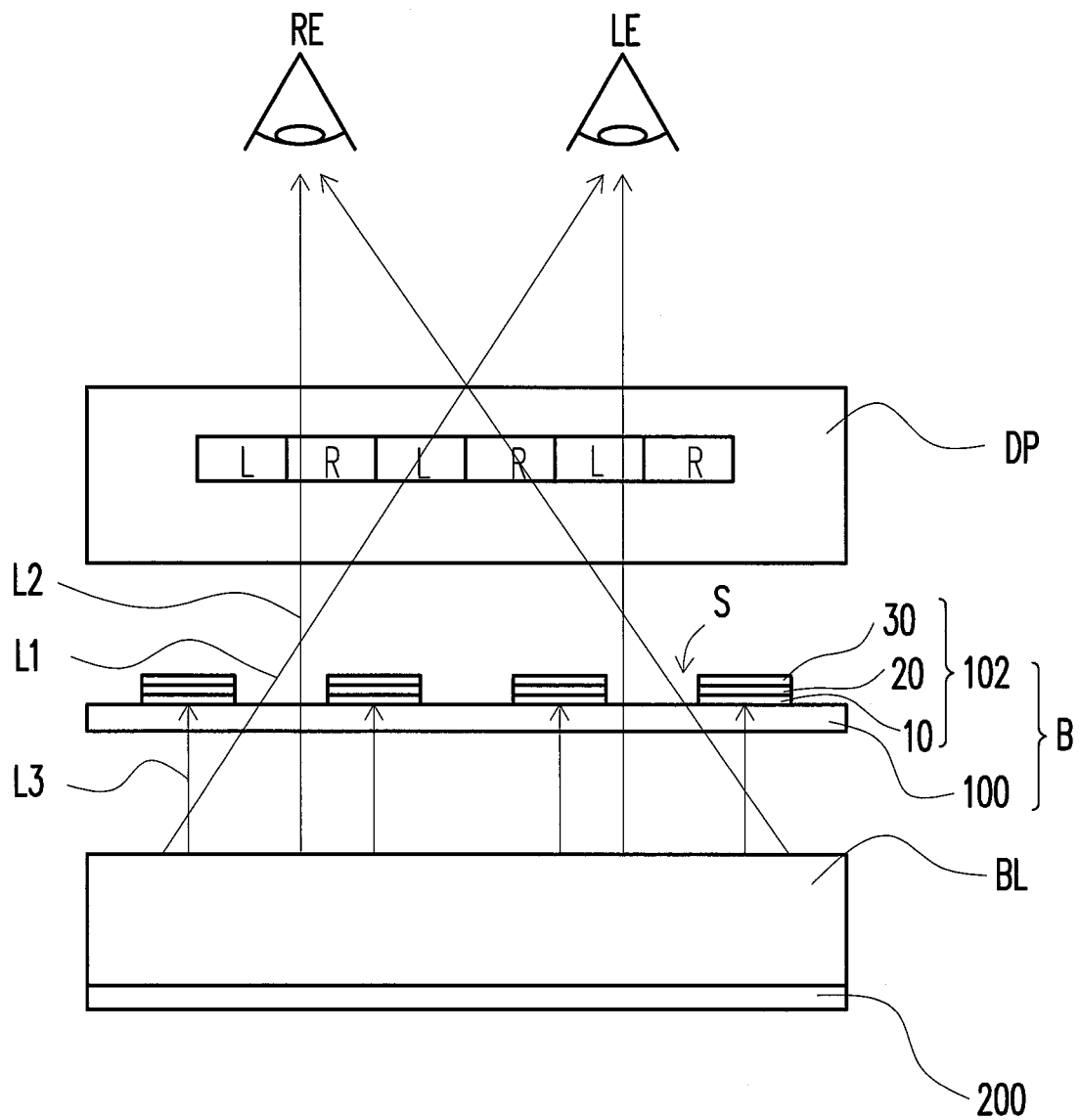
FIG. 1 is a schematic cross-sectional view illustrating a 3D display device according to an embodiment of the invention.

FIG. 1 is a schematic cross-sectional view illustrating a 3D display device according to an embodiment of the invention. With reference to FIG. 1, the 3D display device of this embodiment includes a display panel DP and a barrier structure B. According to this embodiment, the 3D display device further includes a light source module BL that is located below the display panel DP, and the barrier structure B is located between the display panel DP and the light source module BL.

The display panel DP includes a plurality of pixel units, and each of the pixel units includes a left-eye pixel unit L and a right-eye pixel unit R. According to this embodiment, each of the left-eye pixel units L of the display panel DP includes at least one pixel structure, and each of the right-eye pixel units R includes at least one pixel structure as well. The pixel structure includes three sub-pixel structures (e.g., red, green, and blue sub-pixel structures), for instance. The sub-pixel structure includes a data line, a scan line, at least one active device electrically connected to the data line and the scan line, and at least one pixel electrode electrically connected to the active device.

The display panel DP is, for instance, a liquid crystal display (LCD) panel, an electrophoretic display panel, an electro-wetting display panel, an organic light emitting display panel, or the like. The LCD panel of this embodiment serves to explain the invention and should not be construed as a limitation to the invention. In the present embodiment, since the LCD panel is a non-emissive display panel, the light source module BL is configured at the back side of the display panel DP.

The light source module BL may be a direct type light source module or an edge type light source module. Here, the light source module BL can provide the display panel DP with the required planar light source, and thereby a viewer is able to observe an image on the display panel DP. In this embodiment, a reflective film 200 is further disposed below the light source module BL, such that the light from the light source module BL may be emitted to the display panel DP to the greatest extent. Thereby, the utilization rate of the light source can be raised.

Figure 2A:
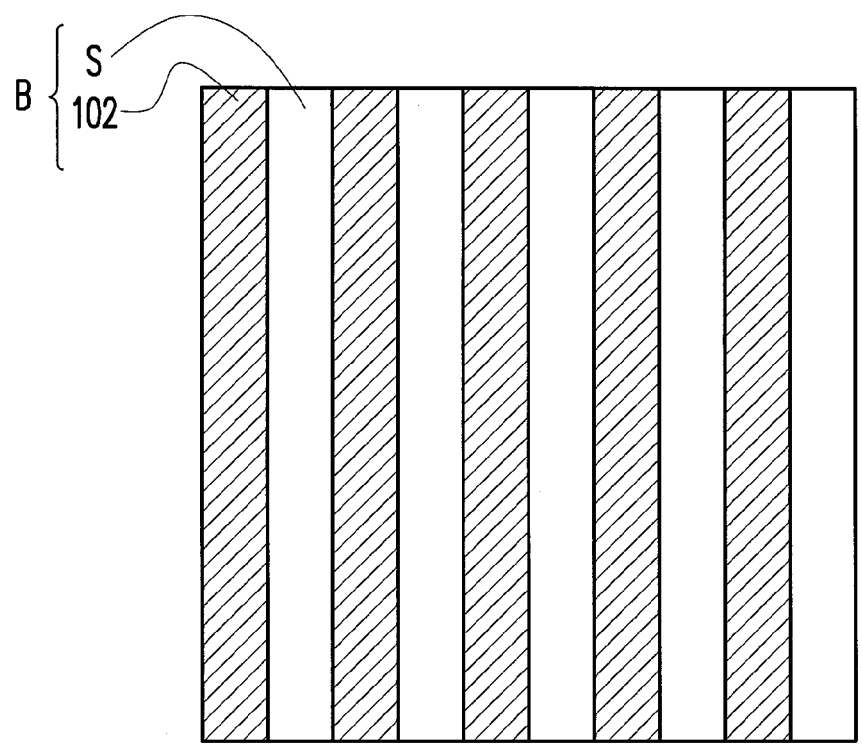
FIG. 2A to FIG. 2D are schematic top views illustrating a barrier structure in a 3D display device according to several embodiments of the invention.
Figure 2B:
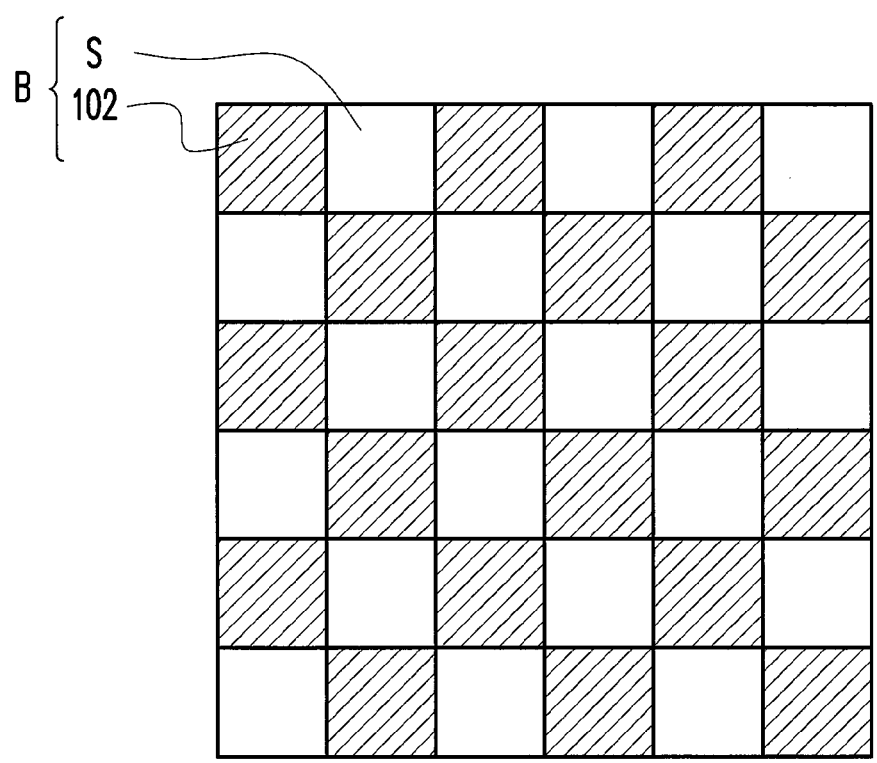
Figure 2C:
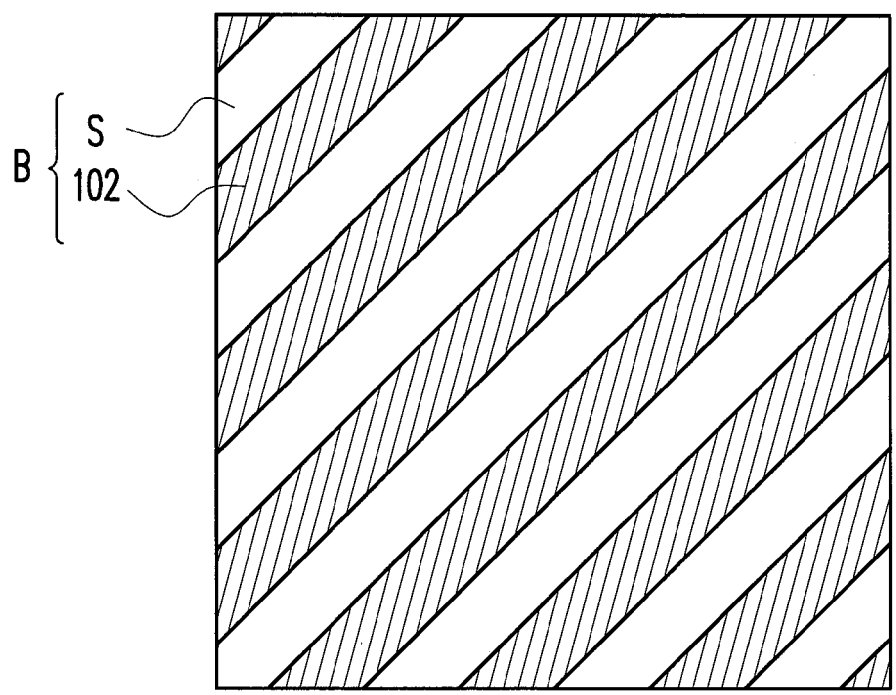
Figure 2D:
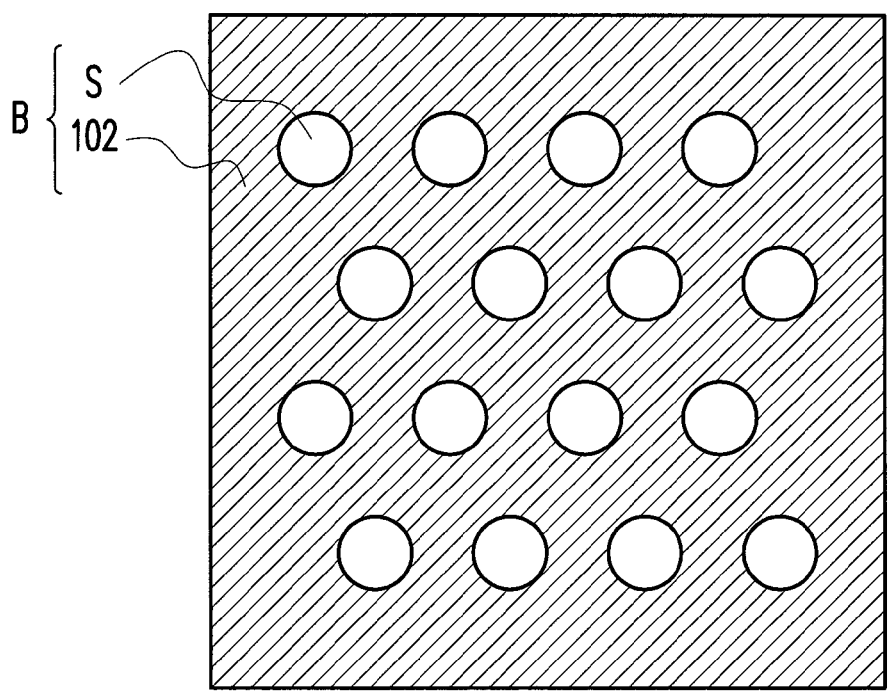

The barrier structure B located at one side of the display panel DP. In this embodiment, the barrier structure B is located between the display panel DP and the light source module BL. The barrier structure B of this embodiment includes a substrate 100, a plurality of barrier patterns 102, and a plurality of transparent slits S. To be more specific, the substrate 100 is a transparent substrate (made of glass, a polymer material, or any other appropriate material, for instance). The barrier patterns 102 are located on the substrate 100 and define the transparent slits S on the substrate 100. Besides, the barrier patterns 102 and the transparent slits S are arranged alternately. In general, the arrangement of the barrier patterns 102 and the transparent slits S is relevant to the arrangement of the left-eye pixel units L and the right-eye pixel units R of the display panel DP. For instance, each of the transparent slits S corresponds to one of the pixel units (including one left-eye pixel unit L and one right-eye pixel unit R). Here, the barrier patterns 102 and the transparent slits S may be arranged in a way shown in FIG. 2A, i.e., the bar-shaped barrier patterns 102 and the bar-shaped transparent slits S are arranged alternately. It is also possible for the barrier patterns 102 and the transparent slits S to be arranged in a chessboard-shaped manner (as shown in FIG. 2B), in a diagonal striped manner (as shown in FIG. 2C), or in a dot-shaped manner (as shown in FIG. 2D). The arrangement of the barrier patterns 102 and the transparent slits S is not limited in the invention as long as the right-eye image and the left-eye image of the display panel DP can be respectively transmitted to the right eye and the left eye of a viewer.

In particular, the barrier patterns 102 of the barrier structure B include a photoelectric conversion structure according to this embodiment. In this embodiment, each of the barrier patterns 102 (i.e., the photoelectric conversion structure) of the barrier structure B includes a first electrode 10, a second electrode 30, and a photoelectric conversion material 20 located between the first electrode 10 and the second electrode 30. The photoelectric conversion structure 102 may be a solar cell or any other structure capable of converting light into electricity. The first and second electrodes 10 and 30 may be made of metal, metal oxide, or an organic conductive material. In order to allow light from the light source module BL and/or external light to enter the photoelectric conversion structure 102, the first electrode 10, the second electrode 30, or both the first electrode 10 and the second electrode 30 are transparent electrodes. The photoelectric conversion material 20 located between the first electrode 10 and the second electrode 30 may be a semiconductor photoelectric conversion material or an organic dye photoelectric conversion material. According to an embodiment of the invention, the semiconductor photoelectric conversion material may include a p-n junction constituted by a p-type semiconductor material and an n-type semiconductor material. The organic dye photoelectric conversion material may be an organic light-absorbing material capable of converting light within a certain wavelength range into electricity, and the light herein refers to ultraviolet light, infrared light, or visible light, for instance.

As shown in FIG. 1, after the light L1 of the light source module BL passes through the transparent slits S of the barrier structure B and then passes through the left-eye pixel unit L of the display panel DP, the light L1 then enters the left eye LE of the viewer; after the light L2 of the light source module BL passes through the transparent slits S of the barrier structure B and then passes through the right-eye pixel unit R of the display panel DP, the light L2 then enters the right eye RE of the viewer. Accordingly, the left eye LE and the right eye RE of the viewer can respectively receive the left-eye image (the light L1) and the right-eye image (the light L2), and thus the viewer is able to observe a stereoscopic image.

The light L3 of the light source module BL is blocked by the barrier structure B and thus cannot arrive at the display panel DP. Particularly, the barrier patterns 102 (i.e., the photoelectric conversion structure) of the barrier structure B have the photoelectric conversion material 20, and the light L3 of the light source module BL can be absorbed by the photoelectric conversion material 20 of the barrier patterns 102 (i.e., the photoelectric conversion structure) and converted into electricity. After the light L3 is absorbed by the photoelectric conversion material 20 of the barrier patterns 102 (i.e., the photoelectric conversion structure) and converted into electricity, the electricity can be further fed back to the display panel DP, the light source module BL, both of the above, or other circuit systems and can then be re-used.

In the embodiment shown in FIG. 1, the barrier structure B includes the substrate 100, the barrier patterns 102, and the transparent slits S. Therefore, the barrier structure B may be attached to the light source module BL through the substrate 100. That is to say, the substrate 100 can be adhered to the light source module BL by an adhesion material, or the substrate 100 can be fixed to the light source module BL through a fixing member, such that the barrier structure B is attached to the light source module BL.

According to another embodiment, the substrate 100 of the barrier structure B may also be located between the display panel DP and the barrier patterns 102 (not shown). Hence, the barrier structure B may be attached to the display panel DP through the substrate 100. That is to say, the substrate 100 can be adhered to the display panel DP by an adhesion material, or the substrate 100 can be fixed to the display panel DP through a fixing member, such that the barrier structure B is attached to the display panel DP.

Besides, in this embodiment, the barrier structure B includes the substrate 100, and thus the barrier structure B can be detachably configured at one side of the display panel DP because of the design of the substrate 100. In other words, the substrate 100 can be detachably configured at one side of the display panel DP by forming a fixing member and a positioning member on the substrate 100. As a result, when a user intends to watch a stereoscopic display image, the barrier structure B allows the display to show the image with parallax by configuring the barrier structure B at one side of the display panel DP. By contrast, when a user intends to view a two-dimensional (2D) display image, the barrier structure B can be removed to increase the brightness of the display panel DP or reduce the power consumption of the light source module BL.

In the embodiment shown in FIG. 1, the barrier structure B in the 3D display device includes the substrate 100, the barrier patterns 102, and the transparent slits S. However, the invention is not limited thereto. In another embodiment, the barrier structure B may also be directly formed on the display panel DP or the light source module BL. The substrate 100 may be omitted as described below.

Figure 3A:
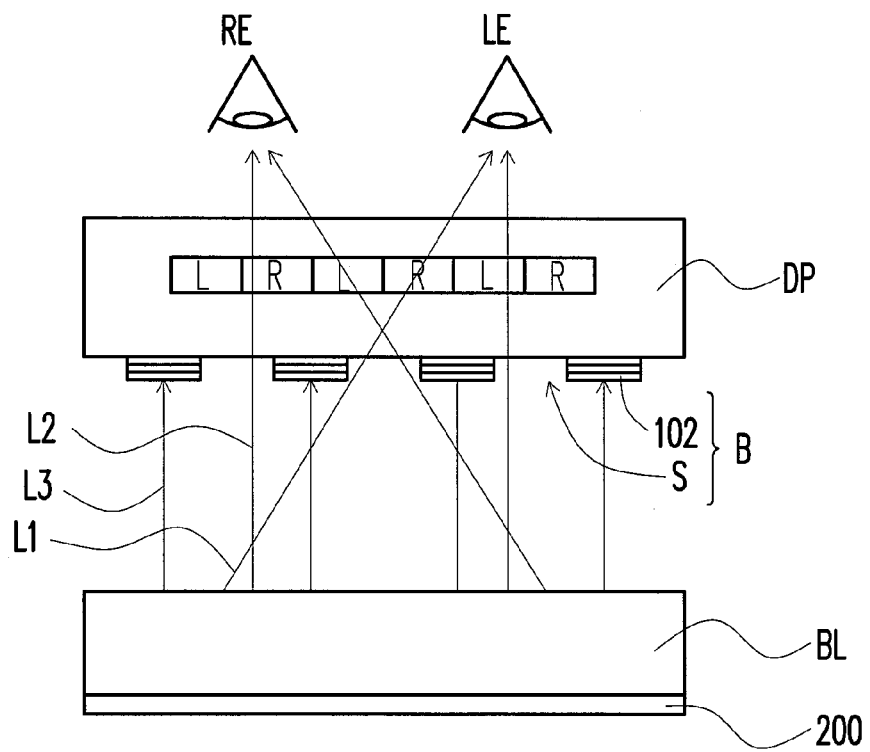
FIG. 3A and FIG. 3B are schematic cross-sectional views respectively illustrating a 3D display device according to an embodiment of the invention.

The 3D display device shown in FIG. 3A is similar to the 3D display device shown in FIG. 1, so that components identical to those in FIG. 1 will be represented by the same numerals and will not be repeated herein. In this embodiment shown in FIG. 3A, the barrier structure B is directly formed on the display panel DP. Specifically, the barrier patterns 102 of the barrier structure B are directly formed on the display panel DP, so as to define the transparent slits S. The barrier patterns 102 can be formed on the outer surface or the inner surface of the display panel DP. Specifically, the barrier patterns 102 can be formed on the outer surface or the inner surface of the display panel DP before, after, or when the display panel DP is formed.

Figure 3B:
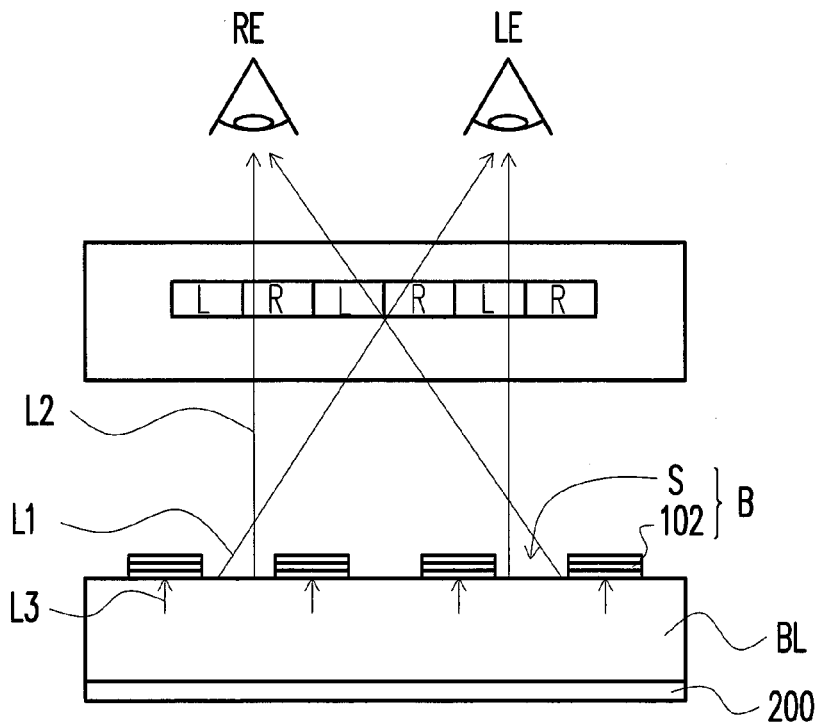

The 3D display device shown in FIG. 3B is similar to the 3D display device shown in FIG. 1, so that components identical to those in FIG. 1 will be represented by the same numerals and will not be repeated herein. In this embodiment shown in FIG. 3B, the barrier structure B is directly formed on the light source module BL. Specifically, the barrier patterns 102 of the barrier structure B are directly formed on the light source module BL, so as to define the transparent slits S. The barrier patterns 102 are often formed on the outer surface of the light source module BL, which should not be construed as a limitation to the invention.

Figure 4:
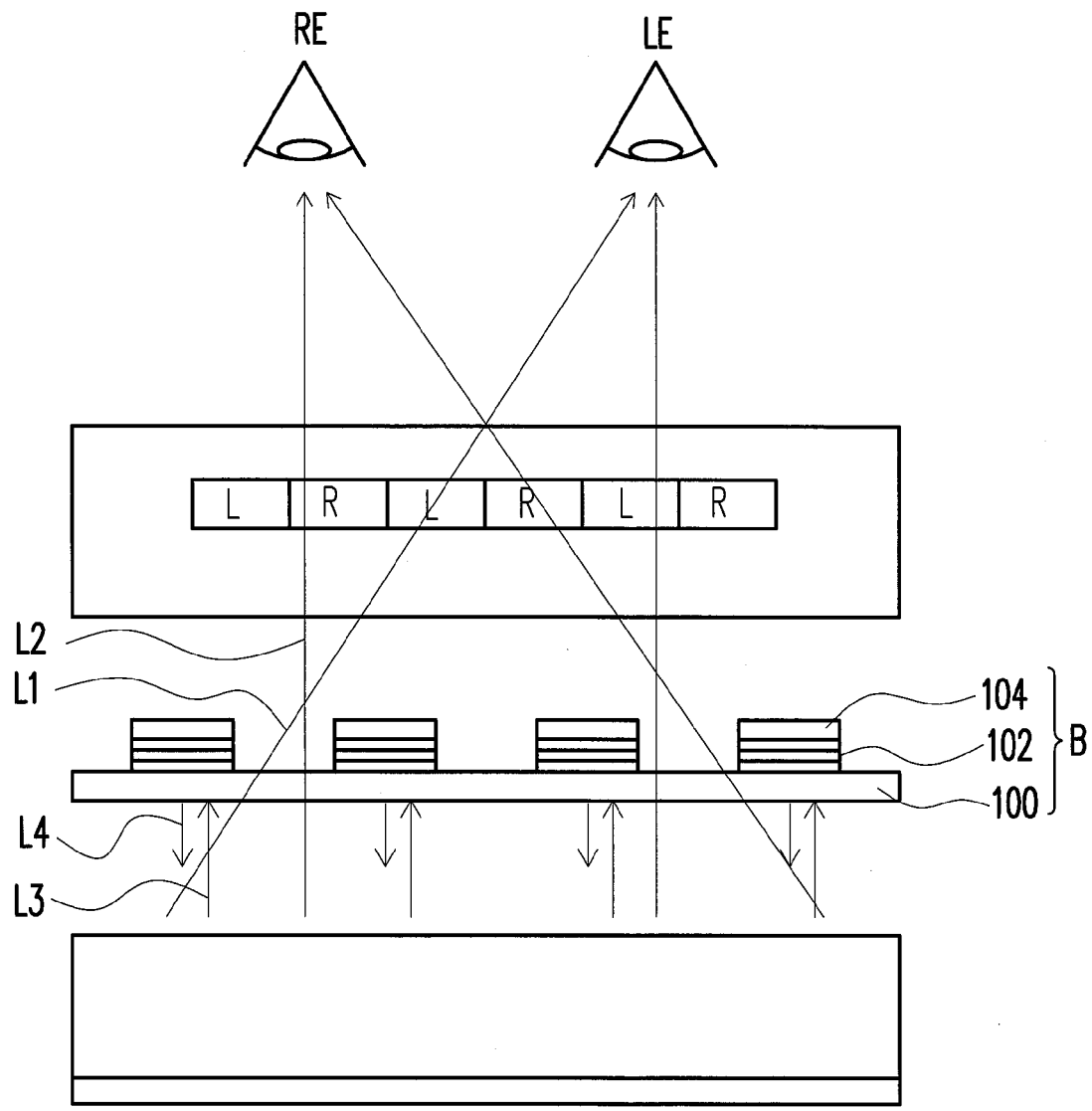
FIG. 4 to FIG. 8 are schematic cross-sectional views respectively illustrating a 3D display device according to an embodiment of the invention.

FIG. 4 is a schematic cross-sectional view illustrating a 3D display device according to an embodiment of the invention. The 3D display device shown in FIG. 4 is similar to the 3D display device shown in FIG. 1, so that components identical to those in FIG. 1 will be represented by the same numerals and will not be repeated herein. The difference between the embodiments respectively depicted in FIG. 4 and FIG. 1 rests in that the barrier structure B further includes a reflective layer 104 in the embodiment shown in FIG. 4. The reflective layer 104 is located on a surface of the barrier patterns 102. Namely, in this embodiment, a reflective layer 104 is additionally configured on top of the barrier patterns 102 of the barrier structure B, and the reflective layer 104 is located between the display panel DP and the barrier patterns 102. As such, when the light L3 from the light source module BL passes through the photoelectric conversion material 20 of the barrier patterns 102 (i.e., the photoelectric conversion structure), the light L3 is absorbed by the photoelectric conversion material 20. Thereafter, the light L3 is reflected by the reflective layer 104, passes through the photoelectric conversion material 20 again, and is absorbed again. The reflected light L4 is then transmitted to the light source module BL and is again reflected by the reflective layer 200, and the light reflected by the reflective layer 200 can once more serve as the light source of the light source module BL.

Figure 5:
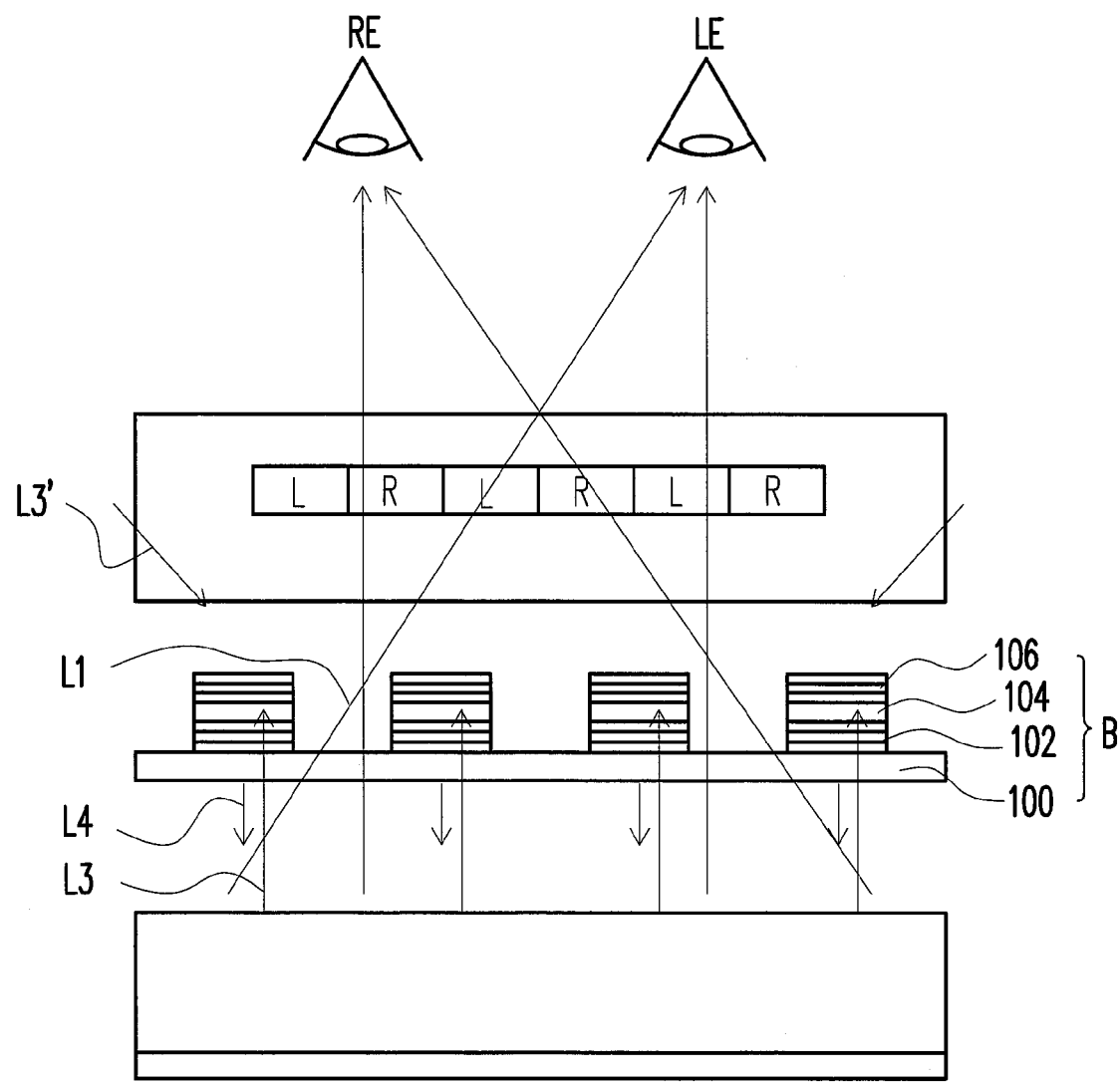

FIG. 5 is a schematic cross-sectional view illustrating a 3D display device according to an embodiment of the invention. The 3D display device shown in FIG. 5 is similar to the 3D display device shown in FIG. 1, so that components identical to those in FIG. 1 will be represented by the same numerals and will not be repeated herein. The difference between the embodiment shown in FIG. 5 and the embodiment shown in FIG. 1 rests in that the barrier structure B further includes the reflective layer 104 and another photoelectric conversion structure 106, and the reflective layer 104 is located between the photoelectric conversion structure 102 and the photoelectric conversion structure 106. The photoelectric conversion structure 102, the reflective layer 104, and the photoelectric conversion structure 106 together constitute the barrier pattern of the barrier structure B. The configuration of the photoelectric conversion structure 106 and the material thereof are similar to those of the photoelectric conversion structure 102 and thus will not be repeated. The barrier structure B of this embodiment includes the photoelectric conversion structure 102 and the photoelectric conversion structure 106. The photoelectric conversion structure 102 absorbs the light L3 from the light source module BL, so as to convert the light blocked by the barrier structure B into electricity. The photoelectric conversion structure 106 located on the other surface of the reflective layer 104 faces the display panel DP. Here, the photoelectric conversion structure 106 mainly serves to absorb the light reflected by the display panel DP, the ambient light transmitted into the display panel DP from the external surroundings, or light that has not been utilized, and the photoelectric conversion structure 106 can convert the absorbed light into electricity.

Figure 6:
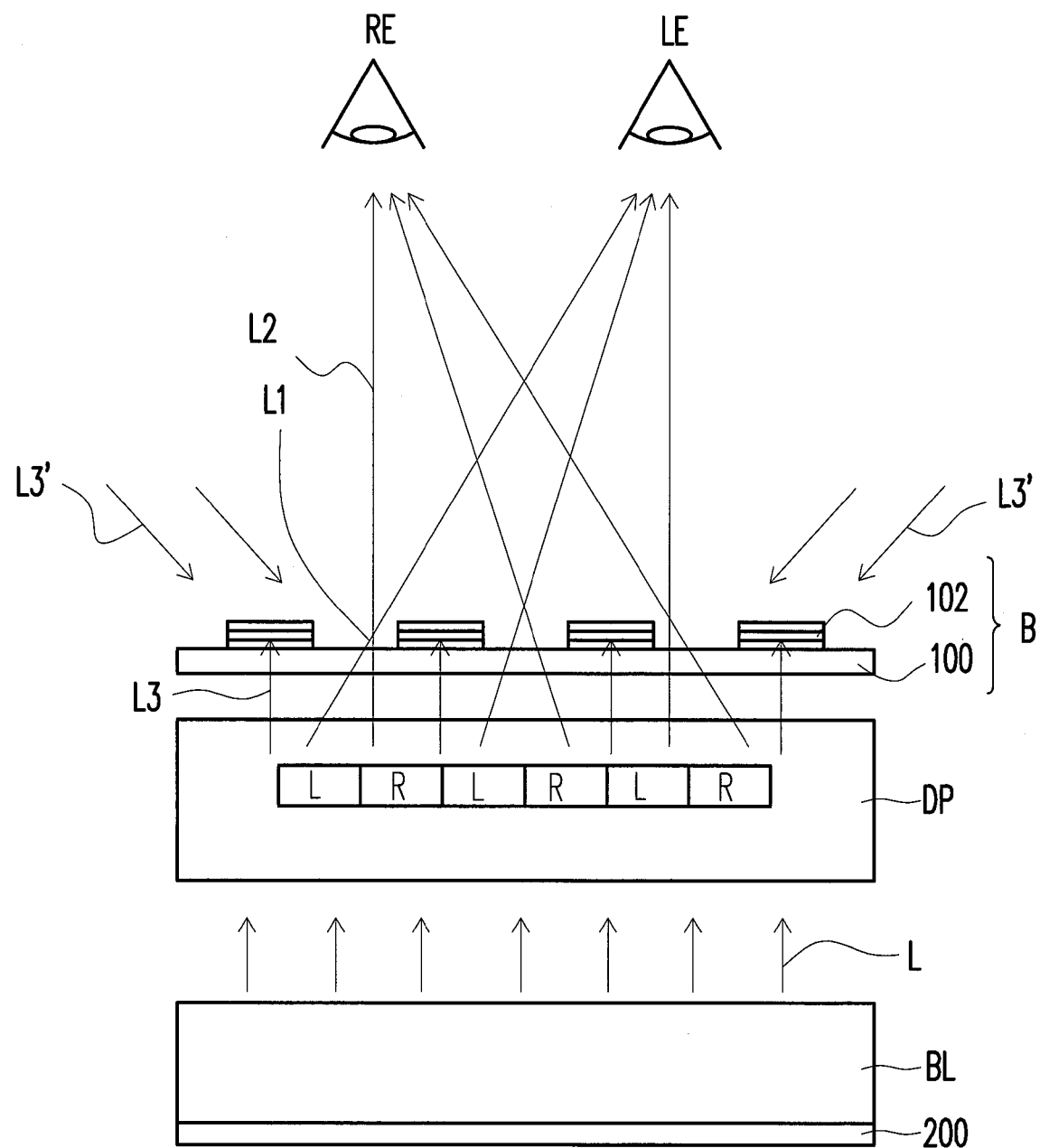

FIG. 6 is a schematic cross-sectional view illustrating a 3D display device according to an embodiment of the invention. The 3D display device shown in FIG. 6 is similar to the 3D display device shown in FIG. 1, so that components identical to those in FIG. 1 will be represented by the same numerals and will not be repeated herein. The difference between the embodiments respectively shown in FIG. 6 and FIG. 1 rests in that the light source module BL in FIG. 6 is located below the display panel DP, such that the display panel DP is located between the barrier structure B and the light source module BL. Here, the light L generated by the light source module BL first passes through the display panel DP, and the barrier structure B located above the display panel DP allows the light L1 (the left-eye image) and the light L2 (the right-eye image) of the display panel DP to enter the left eye LE and the right eye RE of a viewer, respectively. As such, the viewer is able to watch a stereoscopic image. Particularly, the barrier patterns 102 (i.e., the photoelectric conversion structure) of the barrier structure B in this embodiment can absorb both the light L3 (passing through the display panel DP and then blocked by the barrier structure B) and the ambient light L3' (transmitted from the external surroundings) and convert the absorbed light into electricity.

Likewise, the barrier structure B includes the substrate 100, the barrier patterns 102, and the transparent slits S. Hence, the barrier structure B may be attached to the display panel DP through the substrate 100. That is to say, the substrate 100 can be adhered to the display panel DP by an adhesion material, or the substrate 100 can be fixed to the display panel DP through a fixing member, such that the barrier structure B is attached to the display panel DP. Besides, in another embodiment, the barrier structure B can be detachably configured at one side of the display panel DP because of the design of the substrate 100. In other words, the substrate 100 can be detachably configured at one side of the display panel DP by forming a fixing member and a positioning member on the substrate 100. As a result, when a user intends to observe a stereoscopic display image, the barrier structure B allows the display to show the image with parallax by configuring the barrier structure B at one side of the display panel DP. By contrast, when a user intends to observe a 2D display image, the barrier structure B can be removed to increase the brightness of the display panel DP or reduce the power consumption of the light source module BL.

Figure 7:
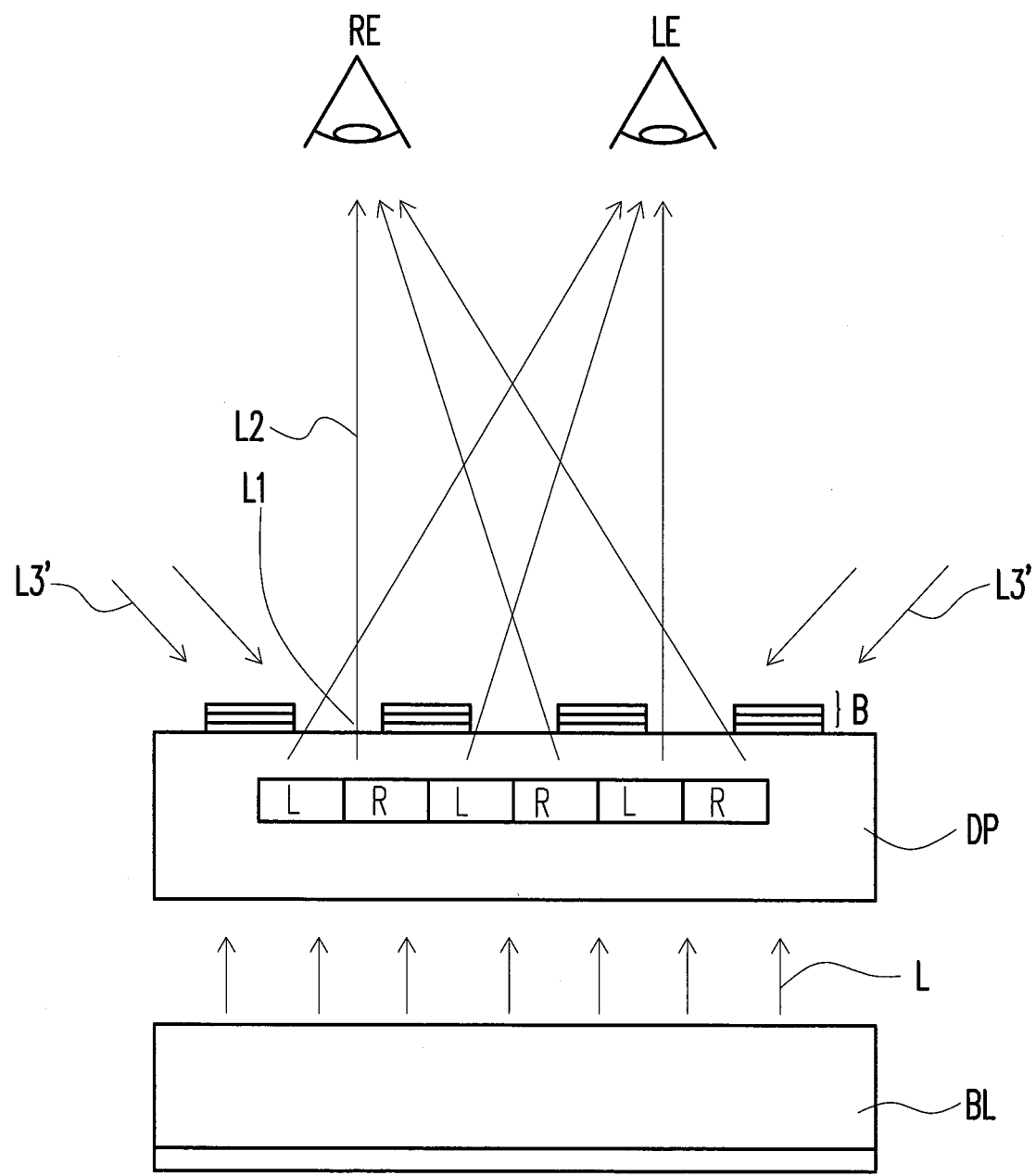

FIG. 7 is a schematic cross-sectional view illustrating a 3D display device according to an embodiment of the invention. The 3D display device shown in FIG. 7 is similar to the 3D display device shown in FIG. 6, so that components identical to those in FIG. 6 will be represented by the same numerals and will not be repeated herein. The difference between the embodiments respectively depicted in FIG. 7 and FIG. 6 rests in that the barrier structure B in FIG. 7 is directly formed on the display panel DP. That is to say, the barrier patterns 102 of the barrier structure B are directly formed on the display panel DP, so as to define the transparent slits S. The barrier patterns 102 can be formed on the outer surface or the inner surface of the display panel DP. Specifically, the barrier patterns 102 can be formed on the outer surface or the inner surface of the display panel DP before, after, or when the display panel DP is formed.

Figure 8:
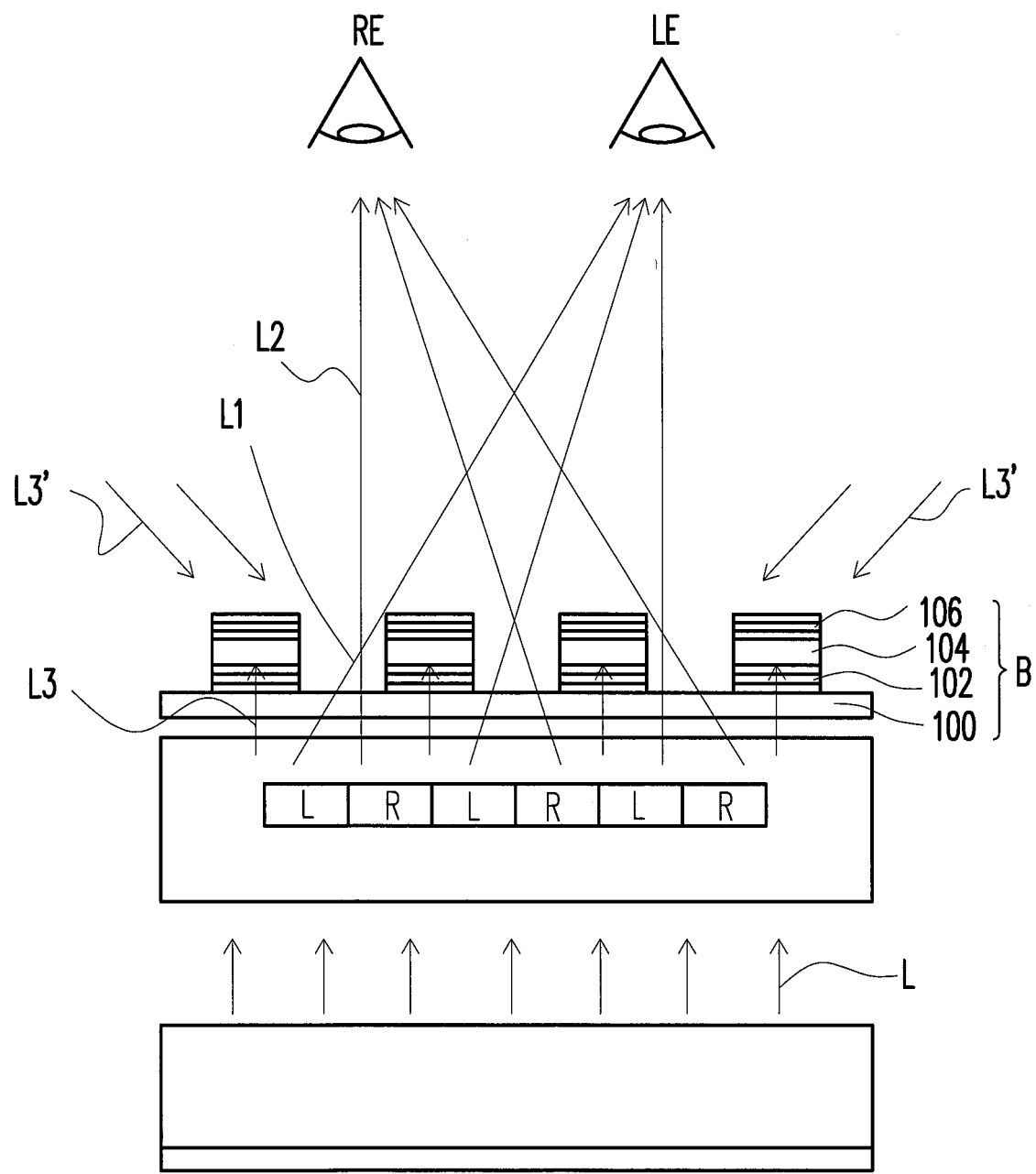

FIG. 8 is a schematic cross-sectional view illustrating a 3D display device according to an embodiment of the invention. The 3D display device shown in FIG. 8 is similar to the 3D display device shown in FIG. 6, so that components identical to those in FIG. 6 will be represented by the same numerals and will not be repeated herein. The difference between the embodiment shown in FIG. 8 and the embodiment shown in FIG. 6 rests in that the barrier structure B further includes the reflective layer 104 and another photoelectric conversion structure 106, and the reflective layer 104 is located between the photoelectric conversion structure 102 and the photoelectric conversion structure 106. The photoelectric conversion structure 102, the reflective layer 104, and the photoelectric conversion structure 106 together constitute the barrier pattern of the barrier structure B. The configuration of the photoelectric conversion structure 106 and the material thereof are similar to those of the photoelectric conversion structure 102. The barrier structure B of this embodiment includes the photoelectric conversion structure 102 and the photoelectric conversion structure 106. The photoelectric conversion structure 102 absorbs the light L3 from the light source module BL, so as to convert the light L3 blocked by the barrier structure B into electricity. The photoelectric conversion structure 106 located on the other surface of the reflective layer 104 can absorb the ambient light L3' and convert the absorbed light L3' into electricity.

In the 3D display device described in the previous embodiments, the barrier patterns 102 of the barrier structure B include the photoelectric conversion structure. Accordingly, the light from the light source module BL may be absorbed by the barrier patterns 102 (i.e., the photoelectric conversion structure) and converted into electricity if the light from the light source module BL cannot pass through the transparent slits S of the barrier structure B. Additionally, the barrier patterns 102 or 106 of the barrier structure B can also absorb the ambient light, so as to improve the photoelectric conversion efficiency of the barrier patterns 102 or 106. After the light absorbed by the barrier patterns 102 or 106 (i.e., the photoelectric conversion structure) of the barrier structure B are converted into electricity, the electricity can be fed back to the 3D display device through an output unit and a control unit and can then be re-used. Please refer to following descriptions.

Figure 9:
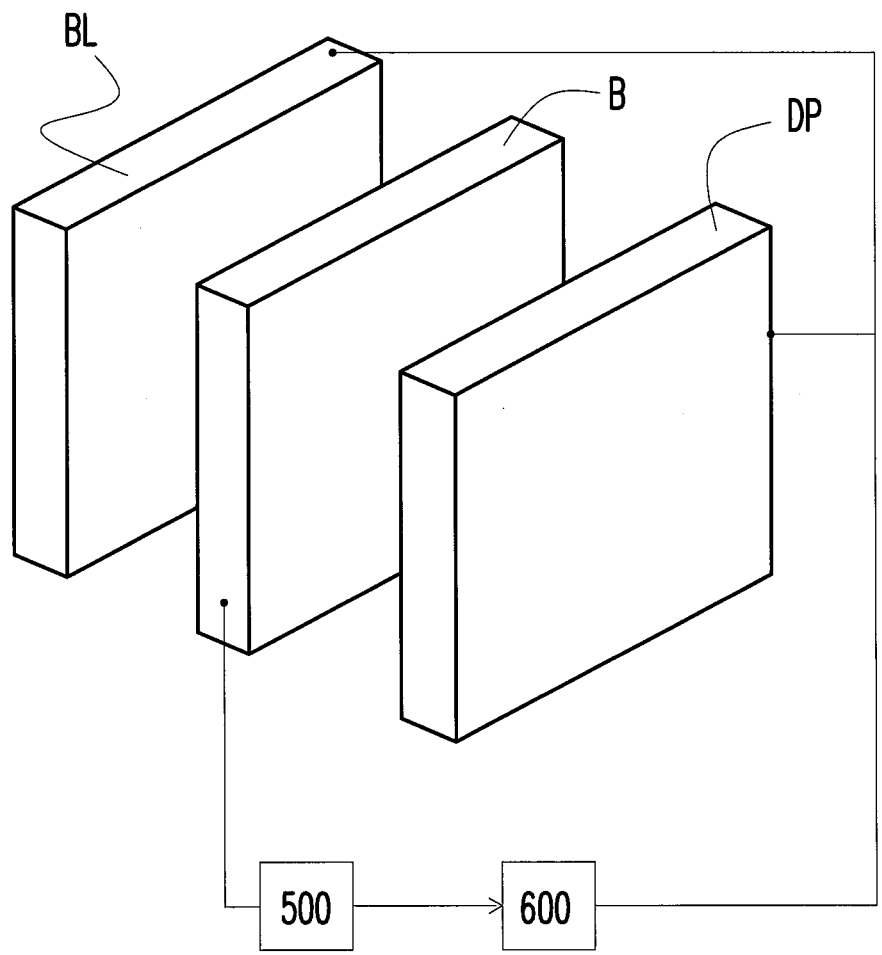
FIG. 9 is a schematic view illustrating a 3D display device according to an embodiment of the invention.

FIG. 9 is a schematic view illustrating a 3D display device according to an embodiment of the invention. With reference to FIG. 9, the 3D display device of this embodiment not only includes the display panel DP, the barrier structure B, and the light source module BL but also includes an output unit 500 and a control unit 600. The output unit 500 is electrically connected to the barrier structure B. The control unit 600 is electrically connected to the output unit 500, the display panel DP, the light source module BL, a combination of the display panel DP and the light source module BL, or other circuit systems. To be more specific, the two electrodes of the output unit 500 and the barrier patterns 102 (i.e., the photoelectric conversion structure) of the barrier structure B are electrically connected, so as to collect the electricity converted by the photoelectric conversion material of the barrier patterns 102 (i.e., the photoelectric conversion structure). Under the control of the control unit 600, the electricity collected by the output unit 500 can be transmitted to the display panel DP, the light source module BL, both of the above, or other circuit systems and can then be directly re-used by the 3D display device.

In light of the foregoing, the photoelectric conversion structure serves as the barrier patterns of the barrier structure in the 3D display device according to the invention. When light passes through the transparent slits, the left-eye image and the right-eye image of the display panel can be respectively transmitted to the left eye and the right eye of a viewer. The light blocked by the barrier structure can be absorbed by the barrier patterns and converted into electricity, and the electricity can be fed back to the 3D display device and then can be re-used. Namely, the light blocked by the barrier structure can be converted into electricity in the invention, and thus the power consumption issue occurring in the conventional 3D display device that employs the barrier panel can be resolved in the invention.

It will be apparent to those skilled in the art that various modifications and variations can be made to the structure of the invention without departing from the scope or spirit of the invention. In view of the foregoing, it is intended that the disclosure cover modifications and variations of this invention provided they fall within the scope of the following claims and their equivalents.

What is claimed is:

1. A three-dimensional display device comprising:
   a display panel; and
   a barrier structure located at one side of the display panel, the barrier structure comprising a plurality of barrier patterns, a plurality of transparent slits, a reflective layer, and a second photoelectric conversion structure, the barrier patterns and the transparent slits being arranged alternatively, the barrier patterns comprising a first photoelectric conversion structure, the reflective layer is located between the display panel and the first photoelectric conversion structure, and the reflective layer is sandwiched between the first photoelectric conversion structure and the second photoelectric conversion structure.

2. The three-dimensional display device as recited in claim 1, wherein the second photoelectric conversion structure comprises a semiconductor photoelectric conversion material or an organic dye photoelectric conversion material.

3. The three-dimensional display device as recited in claim 1, wherein the second photoelectric conversion structure comprises a first electrode, a second electrode, and a photoelectric conversion material located between the first electrode and the second electrode.

4. A three-dimensional display device comprising:
   a display panel;
   a barrier structure located at one side of the display panel, the barrier structure comprising a plurality of barrier patterns, a plurality of transparent slits, a second photoelectric conversion structure, and a reflective layer, the barrier patterns and the transparent slits being arranged alternatively, the barrier patterns comprising a first photoelectric conversion structure, the second photoelectric conversion structure is located above the first photoelectric conversion structure, and the reflective layer is located between the first photoelectric conversion structure and the second photoelectric conversion structure; and
   a light source module located below the display panel, wherein the display panel is located between the barrier structure and the light source module.

5. The three-dimensional display device as recited in claim 1, wherein the second photoelectric conversion structure comprises a semiconductor photoelectric conversion material or an organic dye photoelectric conversion material.

6. The three-dimensional display device as recited in claim 1, wherein the second photoelectric conversion structure comprises a first electrode, a second electrode, and a photoelectric conversion material located between the first electrode and the second electrode.

7. The three-dimensional display device as recited in claim 1, wherein the barrier structure is located on a surface of the display panel.

8. The three-dimensional display device as recited in claim 7, wherein the barrier structure is adhered to the surface of the display panel.

9. The three-dimensional display device as recited in claim 1, wherein the barrier structure comprises a substrate and the barrier patterns located on the substrate, and the barrier patterns define the transparent slits on the substrate.

10. A three-dimensional display device comprising:
   a display panel; and
   a barrier structure located at one side of the display panel, the barrier structure comprising a plurality of barrier patterns, a plurality of transparent slits, a substrate, a reflective layer, and a second photoelectric conversion structure, the barrier patterns and the transparent slits being arranged alternatively, the barrier patterns comprising a first photoelectric conversion structure, the barrier patterns located on the substrate, the barrier patterns define the transparent slits on the substrate, the substrate is detachably configured at a side of the display panel, and the reflective layer is sandwiched between the first photoelectric conversion structure and the second photoelectric conversion structure.

11. The three-dimensional display device as recited in claim 1, wherein the first photoelectric conversion structure comprises a semiconductor photoelectric conversion material or an organic dye photoelectric conversion material.

12. The three-dimensional display device as recited in claim 1, wherein the first photoelectric conversion structure comprises a first electrode, a second electrode, and a photoelectric conversion material located between the first electrode and the second electrode.

13. The three-dimensional display device as recited in claim 1, wherein the display panel comprises a plurality of pixel units, each of the pixel units comprises a left-eye pixel unit and a right-eye pixel unit, and each of the transparent slits corresponds to one of the pixel units.

14. The three-dimensional display device as recited in claim 1, further comprising:
   a light source module located below the display panel;
   an output unit electrically connected to the first photoelectric conversion structure of the barrier structure; and
   a control unit electrically connected to the output unit and electrically connected to the display panel, the light source module, or a combination of the display panel and the light source module.

15. The three-dimensional display device as recited in claim 14, wherein the barrier structure is located between the display panel and the light source module.

16. The three-dimensional display device as recited in claim 15, wherein the reflective layer is located on a surface of the barrier patterns.

17. The three-dimensional display device as recited in claim 4, further comprising:
   an output unit electrically connected to the first photoelectric conversion structure of the barrier structure; and
   a control unit electrically connected to the output unit and electrically connected to the display panel, the light source module, or a combination of the display panel and the light source module.

18. The three-dimensional display device as recited in claim 10, further comprising:
   a light source module located below the display panel;
   an output unit electrically connected to the first photoelectric conversion structure of the barrier structure; and
   a control unit electrically connected to the output unit and electrically connected to the display panel, the light source module, or a combination of the display panel and the light source module.

19. The three-dimensional display device as recited in claim 14, wherein the first photoelectric conversion structure converts a light to an electrical current, and the electrical current is transmitted to the display panel, the light source module, or a combination of the display panel and the light source module through the output unit and the control unit.

* * * * *